UNITED STATES PATENT OFFICE.

JOSEPH M. LONG, OF CHICAGO, ILLINOIS.

COMPOSITION FOR PRESERVING WOOD, &c.

1,001,657.  Specification of Letters Patent.  Patented Aug. 29, 1911.

No Drawing.   Application filed November 1, 1910.  Serial No. 590,098.

*To all whom it may concern:*

Be it known that I, JOSEPH M. LONG, a citizen of the United States, and resident of Chicago, in the county of Cook and State of Illinois, have invented a certain new and useful Improvement in Compositions for Preserving Wood, &c., of which the following is a description.

My invention relates to an improvement in an antiseptic composition which is intended more especially for use on green lumber; railway ties, and the like; the solution being permitted to penetrate the lumber by means of either absorption or pressure, and thus become chemically combined with and form a part of the wood-sap.

My solution, when applied to the wood under pressure, will, as before stated, be assimilated by the unfermented sap and fill the cells and thoroughly penetrate the fiber, thus making the wood stronger and more durable than where the sap has been removed before treatment. In the methods heretofore frequently employed, where the wood was first steamed or partially dried, the sap, or a greater portion thereof, is taken out of the wood before any preservative compound or solution is applied thereto; this method materially changes the natural state or condition of the wood by reason of the extraction of the vital elements, the fiber being more or less injured.

As is well known, if albumin is heated it coagulates, and if the heating exceed 158 degrees Fahrenheit it becomes difficult, or almost impossible, to dissolve the albumin with ordinary solvents; therefore, the compositions or solutions which are employed in a process where the wood is previously heated—either by steam or otherwise—cannot form the chemical combination necessary for a thorough treatment of the wood, in view of the fact that the albuminoids would, under such treatment, coagulate and fail to assimilate any solution that might be applied. On the other hand, it is well known that at a low temperature, as for example sixty degrees Fahrenheit, albumin will dissolve slowly like gum. It is perfectly clear, therefore, that in order to provide an antiseptic solution which will prevent the growth of fungi—the attack of bacteria and dry rot—that is to say, a solution or composition which is capable of thoroughly penetrating the fiber and fill the cells, it is necessary to employ a cold solution, so that the albuminoids will not become coagulated, which cold solution will be assimilated by the albuminoids and form an unchangeable or insoluble composition.

The ingredients of my composition and the proportions I prefer to employ for general use, are approximately as follows:—twelve ounces of chlorid of sodium; one ounce of calcium sulfate (which must be chemically pure and not plaster of Paris or calcined gypsum); one ounce of zinc sulfate; three-quarters of an ounce of copper sulfate and one-quarter of an ounce of ferric sulfate, to three gallons of cold water.

In making my composition I employ three gallons of cold water, that is, of not to exceed 98 degrees Fahrenheit, in which I first dissolve twelve ounces of chlorid of sodium and then add one ounce of calcium sulfate (which must be chemically pure and not gypsum); one ounce of zinc sulfate; three-quarters of an ounce of copper sulfate and one-quarter of an ounce of ferric sulfate; all of the said sulfates being practically dissolved as the mixing proceeds; the entire mass being agitated by compressed air, or other suitable means.

After the above ingredients have been thoroughly mixed and agitated in cold water as aforesaid, the result obtained is a transparent, odorless solution which is ready for use. It goes without saying that the strength of the solution as given above may be varied more or less, the quantity of water being either increased or diminished, depending upon the nature of the use to which the composition is to be put or the character or nature of the wood to be treated. Another important result obtained by the use of my composition is that the article treated will not possess any odor other than its natural one; and furthermore, the action of the composition or solution is of such a nature that it will not impair or destroy the natural color of the article treated, but, on the other hand, will tend to brighten the same. It is very readily seen that these characteristics last referred to are most desirable ones and will enhance the commercial value of the article treated.

By employing my solution or composition green timber or lumber may be treated with all of its sap remaining therein, as the solution combines with the sap and prevents any discoloration or stain; and as my solution will thoroughly penetrate and affect the green timber up to the bark, it is clear that a very material saving is obtained, more especially in connection with what is known as sap-timber.

From the foregoing description of my invention it is readily apparent that the object thereof is to provide a composition or solution which will chemically unite the sap or albuminoids of timber and the like and thus prevent any fermentation and the resultant decay.

I have set forth the preferable ingredients and the proportions employed by me to produce the results herein set forth, but of course the same may be varied more or less without departing from the spirit of my invention, and I do not wish to be understood as limiting myself to the exact data or formula given, but What I do claim as my invention and wish to secure by Letters Patent, is:—

1. A composition for preserving wood, and so forth, composed of twelve ounces of chlorid of sodium, one ounce of calcium sulfate, one ounce of zinc sulfate, three-quarters of an ounce of copper sulfate, one-quarter of an ounce of iron sulfate and three gallons of water.

2. A composition for preserving wood, and so forth, composed of twelve ounces of chlorid of sodium, one ounce of calcium sulfate, one ounce of zinc sulfate, three-quarters of an ounce of copper sulfate, one-quarter of an ounce of iron sulfate, with sufficient water to permit of the proper saturation of the article treated.

JOSEPH M. LONG.

Witnesses:
NORMAN A. STREET,
E. N. KERNWEIN.